US011156485B1

United States Patent
Krishnan et al.

(10) Patent No.: US 11,156,485 B1
(45) Date of Patent: Oct. 26, 2021

(54) ROTATING SENSOR ASSEMBLY

(71) Applicant: Ford Global Technologies, LLC, Dearborn, MI (US)

(72) Inventors: Venkatesh Krishnan, Canton, MI (US); Segundo Baldovino, Novi, MI (US); Rashaun Phinisee, Ypsilanti, MI (US); Raghuraman Surineedi, Dearborn, MI (US); Michael Robertson, Jr., Garden City, MI (US); Tyler D. Hamilton, Farmington, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/153,051

(22) Filed: Jan. 20, 2021

(51) Int. Cl.
*G01D 11/24* (2006.01)
*B60R 11/00* (2006.01)
*B60H 1/00* (2006.01)
*G01S 17/86* (2020.01)

(52) U.S. Cl.
CPC ....... *G01D 11/245* (2013.01); *B60H 1/00271* (2013.01); *B60R 11/00* (2013.01); *G01S 17/86* (2020.01); *B60R 2011/004* (2013.01); *B60R 2011/0085* (2013.01)

(58) Field of Classification Search
CPC ........ G01D 11/245; G01S 17/86; B60R 11/00
See application file for complete search history.

(56) References Cited

U.S. PATENT DOCUMENTS

| 10,823,824 | B2* | 11/2020 | Schmidt | G01S 17/42 |
| 11,035,934 | B2* | 6/2021 | Schmidt | G01S 17/10 |
| 2009/0250533 | A1 | 10/2009 | Akiyama et al. | |
| 2012/0162428 | A1 | 6/2012 | Wee | |
| 2020/0191614 | A1 | 6/2020 | Ellgas et al. | |
| 2020/0191918 | A1 | 6/2020 | Ellgas et al. | |
| 2021/0146406 | A1* | 5/2021 | Sykula | B08B 5/02 |
| 2021/0227104 | A1* | 7/2021 | Krishnan | E05B 47/0002 |
| 2021/0268995 | A1* | 9/2021 | Krishnan | B60S 1/56 |
| 2021/0278504 | A1* | 9/2021 | Phinisee | G01S 7/4813 |

FOREIGN PATENT DOCUMENTS

KR    20180102460 A    9/2018

* cited by examiner

*Primary Examiner* — Jamel E Williams
(74) *Attorney, Agent, or Firm* — Frank A. MacKenzie; Bejin Bieneman PLC (57) ABSTRACT

A sensor assembly includes a base, a housing mounted to the base and rotatable relative to the base around an axis in a direction of rotation, a sensing apparatus inside the housing and rotatable with the housing, a sensor window fixed relative to the housing, and a duct on an exterior of the housing. The sensing apparatus has a field of view through the sensor window. The duct includes an inlet open toward the direction of rotation and an outlet aimed across the sensor window.

19 Claims, 6 Drawing Sheets

ROTATING SENSOR ASSEMBLY

BACKGROUND

Vehicles, such as autonomous or semi-autonomous vehicles, typically include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Some sensors are communications devices, for example, vehicle-to-infrastructure (V2I) or vehicle-to-vehicle (V2V) devices.

DETAILED DESCRIPTION

A sensor assembly includes a base, a housing mounted to the base and rotatable relative to the base around an axis in a direction of rotation, a sensing apparatus inside the housing and rotatable with the housing, a sensor window fixed relative to the housing, and a duct on an exterior of the housing. The sensing apparatus has a field of view through the sensor window. The duct includes an inlet open toward the direction of rotation and an outlet aimed across the sensor window.

The sensor assembly may further include a motor arranged to rotate the housing in the direction of rotation relative to the base.

The outlet may be open away from the direction of rotation.

A cross-sectional area of the outlet may be smaller than a cross-sectional area of the inlet.

The housing may include an outer wall having a partial cylindrical shape extending circumferentially from the inlet in the direction of rotation at a constant radius from the axis. The sensor window may be a first sensor window, the sensor assembly may further include a second sensor window fixed relative to the housing, and the outer wall may extend circumferentially from the inlet in the direction of rotation toward the second sensor window.

The outer wall may extend circumferentially from the inlet toward the outlet at the constant radius, and the outer wall partially forms the duct. The inlet may extend radially outward from the outer wall relative to the axis, and the duct defines an airflow path radially outward from the outer wall relative to the axis.

The inlet may pass through the outer wall, and the duct may define an airflow path radially inward from the outer wall relative to the axis.

The sensor window may be disposed farther from the axis than the radius of the outer wall. An exterior surface of the sensor window may face in a direction that is radially outward and circumferentially in the direction of rotation relative to the axis.

The sensor assembly may further include a ramp positioned adjacent to the sensor window opposite the outlet. The ramp may include a leading surface facing circumferentially toward the sensor window and a trailing surface facing circumferentially away from the sensor window, and the leading surface and the trailing surface may be elongated parallel to the axis. The leading surface and the trailing surface may be elongated from a bottom edge of the sensor window to a top edge of the sensor window.

The sensor assembly may further include a gutter elongated above the sensor window adjacent to the sensor window. The gutter may be elongated from a beginning end nearer to the outlet to an open end farther from the outlet.

The sensor assembly may further include an air filter covering the inlet. The air filter may be a semipermeable fabric.

The sensor window may extend circumferentially around the axis for at most 45°.

With reference to the Figures, a sensor assembly 102 of a vehicle 100 includes a base 104, a housing 106 mounted to the base 104 and rotatable relative to the base 104 around an axis A in a direction of rotation D, a first sensing apparatus 108a inside the housing 106 and rotatable with the housing 106, a first sensor window 110a fixed relative to the housing 106, and a first duct 112 on an exterior of the housing 106. The first sensing apparatus 108a has a field of view through the first sensor window 110a. The first duct 112 includes a first inlet 114 open toward the direction of rotation D and a first outlet 116 aimed across the first sensor window 110a.

The housing 106 and the first sensing apparatus 108a rotate together in the direction of rotation D to provide the first sensing apparatus 108a with a 360° view around the vehicle 100. As the housing 106 rotates in the direction of rotation D, air is forced into the first inlet 114 of the first duct 112 because the first inlet 114 is open toward the direction of rotation D. The air flows through the first duct 112 relative to the housing 106 and exits at the first outlet 116. After exiting at the first outlet 116, the air flows across the first sensor window 110a. The airflow across the first sensor window 110a can blow debris off the first sensor window 110a and/or prevent debris from contacting the first sensor window 110a. The airflow is generated as a byproduct of the rotation of the housing 106 and thus does not require additional components to generate the airflow, reducing complexity and cost of the sensor assembly 102.

Figure 1:
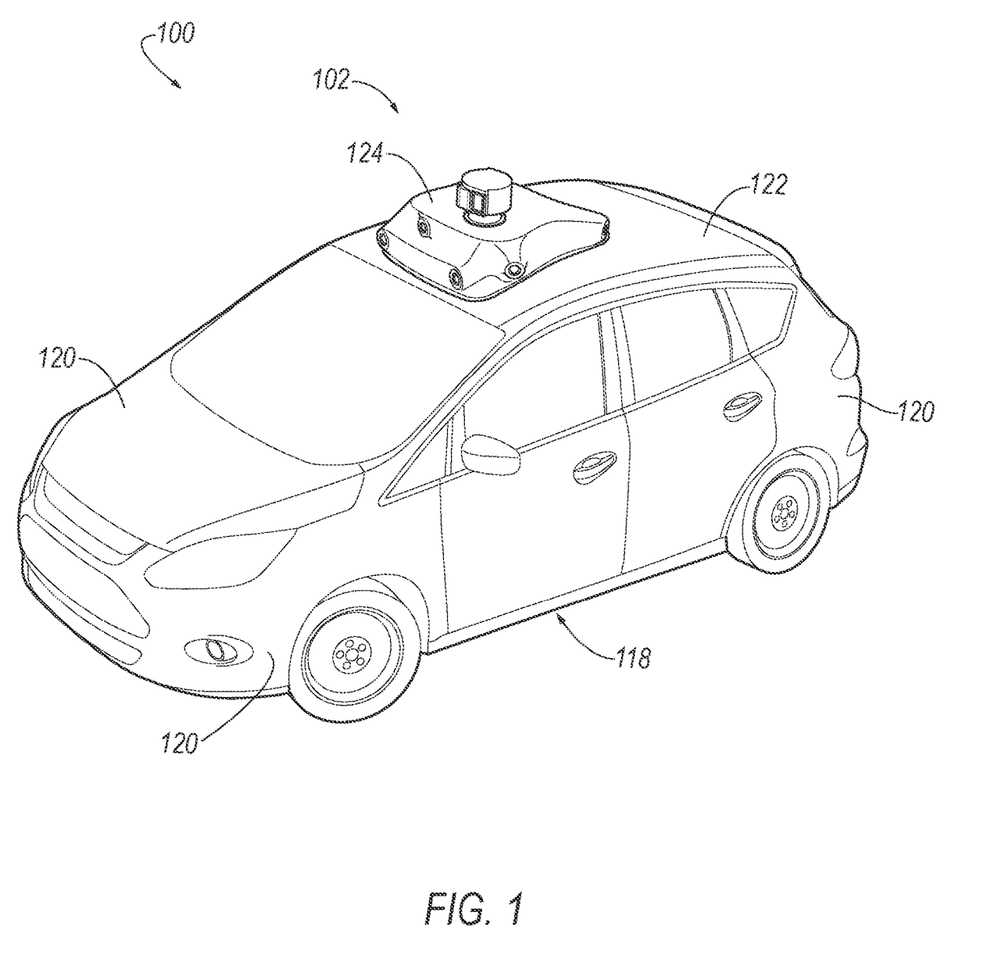
FIG. 1 is a perspective view of an example vehicle including an example sensor assembly.

With reference to FIG. 1, the vehicle 100 may be any suitable type of automobile, e.g., a passenger or commercial automobile such as a sedan, a coupe, a truck, a sport utility vehicle, a crossover vehicle, a van, a minivan, a taxi, a bus, etc. The vehicle 100, for example, may be an autonomous vehicle. In other words, the vehicle 100 may be autonomously operated such that the vehicle 100 may be driven without constant attention from a driver, i.e., the vehicle 100 may be self-driving without human input. Autonomous operation can be based in part on data received from the sensor assembly 102.

The vehicle 100 includes a vehicle body 118. The vehicle body 118 includes body panels 120 partially defining an exterior of the vehicle 100. The body panels 120 may present a class-A surface, e.g., a finished surface exposed to view by a customer and free of unaesthetic blemishes and defects. The body panels 120 include, e.g., a roof 122, etc.

A casing 124 for the sensor assembly 102 and other sensors is attachable to the vehicle 100, e.g., to one of the body panels 120 of the vehicle 100, e.g., the roof 122. For example, the casing 124 may be shaped to be attachable to the roof 122, e.g., may have a shape matching a contour of the roof 122. The casing 124 may be attached to the roof 122, which can provide the first sensing apparatus 108a and a second sensing apparatus 108b of the sensor assembly 102 with an unobstructed field of view of an area around the vehicle 100. The casing 124 may be formed of, e.g., plastic or metal. The sensor assembly 102 is supported by the casing 124. The sensor assembly 102 can be disposed on top of the casing 124 at a highest point of the casing 124.

Figure 2:
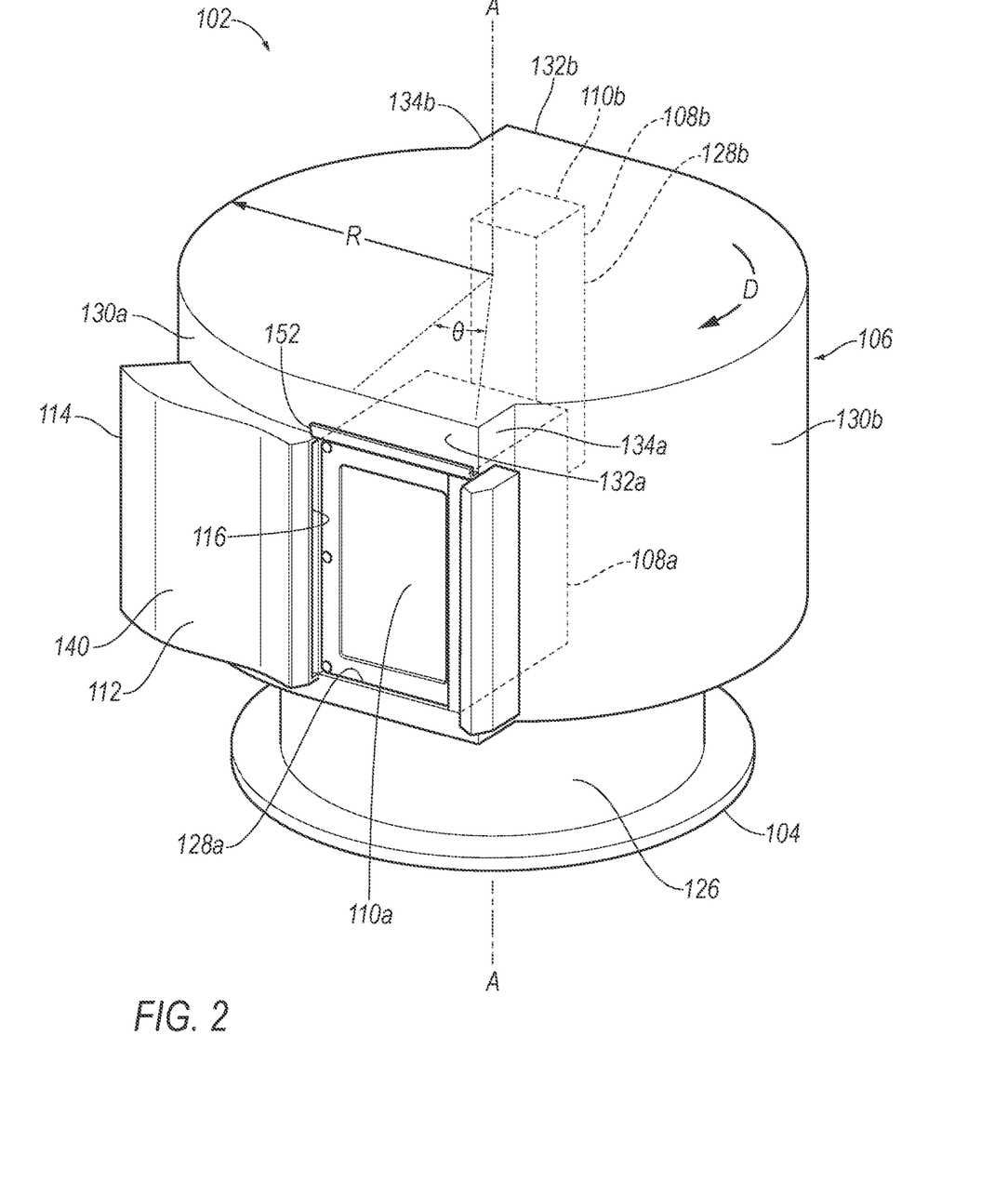
FIG. 2 is a perspective view of a first example of the sensor assembly.
Figure 4:
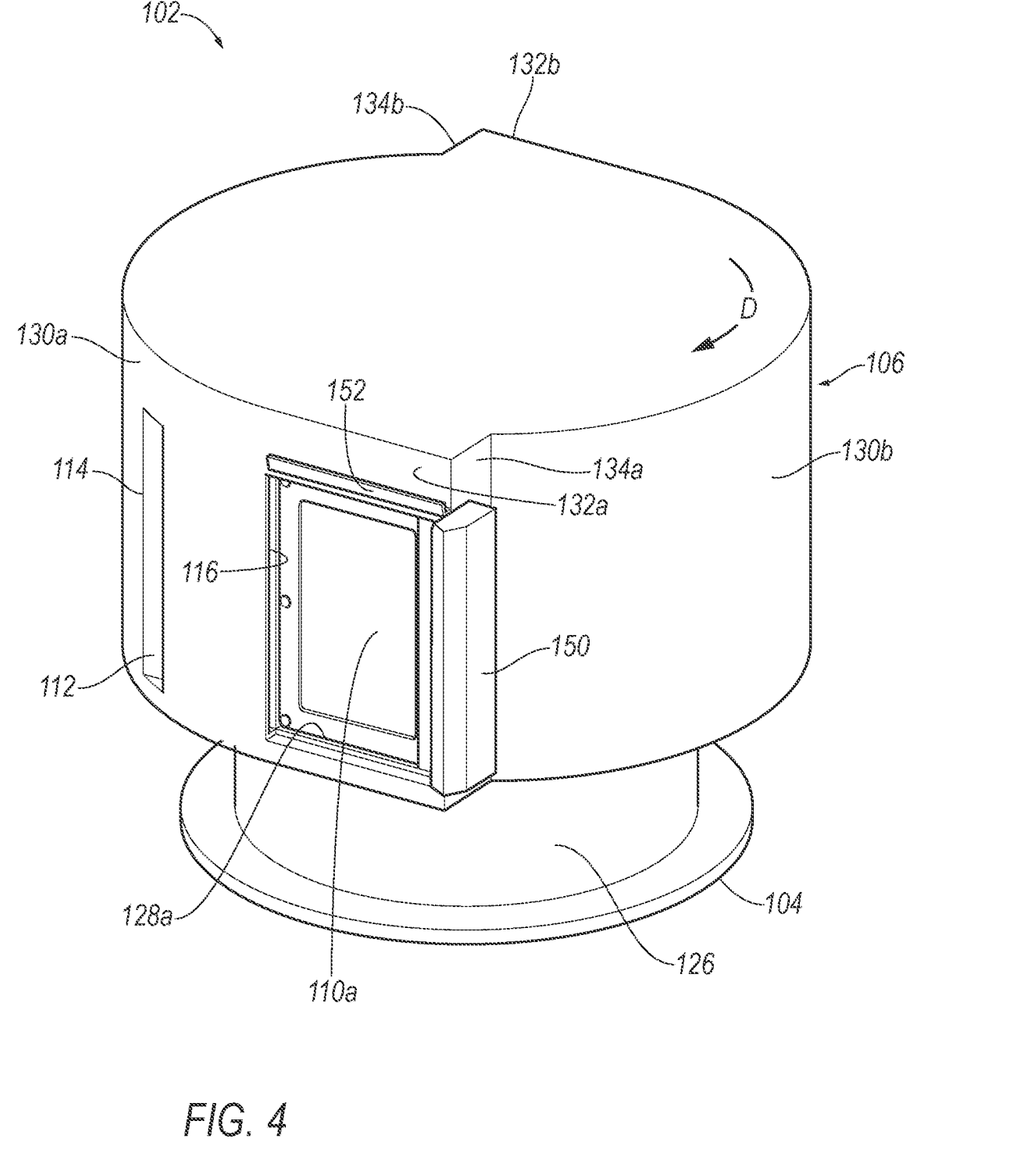
FIG. 4 is a perspective view of a second example of the sensor assembly.

With reference to FIGS. 2 and 4, the sensor assembly 102 includes the base 104. The base 104 is attached to the casing 124 on top of the casing 124. The base 104 can be bolted to the casing 124, e.g., through bolt holes in the base 104. The base 104 is mounted to the vehicle 100, e.g., via the casing 124, and the vehicle 100 defines a forward direction, i.e., a direction of forward travel for the vehicle 100.

The sensor assembly 102 includes a motor 126. The motor 126 is arranged to drivably rotate the housing 106 in the direction of rotation D about the axis A. The motor 126 can be positioned, e.g., inside the base 104. The motor 126 can be, e.g., an electric motor. The motor 126 can rotate the housing 106 at a high speed, e.g., 600 revolutions per minute.

The housing 106 is mounted to the base 104 and rotatable relative to the base 104 around the axis A in the direction of rotation D. For example, the housing 106 can be mounted, e.g., fastened, to a sensor body (not shown). The sensor body can be rotatably attached to the base 104 and drivable by the motor 126. The housing 106 can cover a top and sides of the sensor body.

The sensing apparatuses 108 are disposed inside the housing 106 and are rotatable with the housing 106. For example, the sensing apparatuses 108 are mounted to and fixed relative to the sensor body. The second sensing apparatus 108b can be a same type of sensor as the first sensing apparatus 108a, and the second sensing apparatus 108b can be rotationally symmetric, e.g., second-degree rotationally symmetric, around the axis A with respect to the first sensing apparatus 108a, as explained in more detail below. The sensing apparatuses 108 may be designed to detect features of the outside world; for example, the sensor apparatuses may be radar sensors, scanning laser range finders, light detection and ranging (LIDAR) devices, or image processing sensors such as cameras. In particular, the sensor apparatuses may be LIDAR devices, e.g., scanning LIDAR devices. A LIDAR device detects distances to objects by emitting laser pulses at a particular wavelength and measuring the time of flight for the pulse to travel to the object and back. The first sensing apparatus 108a has a field of view through the first sensor window 110a encompassing a region from which the first sensing apparatus 108a receives input, and the second sensing apparatus 108b has a field of view through a second sensor window 110b encompassing a region from which the second sensing apparatus 108b receives input. As the sensing apparatuses 108 rotate with the housing 106, the fields of view encompass a horizontal 360° around the vehicle 100.

The sensor assembly 102 can include at least one sensor window 110, e.g., two sensor windows 110. The sensor windows 110 are fixed relative to the housing 106 and rotatable with the housing 106. The housing 106 includes respective openings 128, e.g., a first opening 128a and a second opening 128b, in which the sensor windows 110 are positioned.

The sensor windows 110 have a collective circumferential extent around the axis A, that is, a collective angular sweep covered by the sensor windows 110. The circumferential extent around the axis A of each sensor window 110 is an angle θ formed at the axis A between a clockwisemost point and a counterclockwisemost point of that sensor window 110, i.e., an angular sweep around the axis A from one circumferential end of that sensor window 110 to the other circumferential end of that sensor window 110. For example, the sensor windows 110 can collectively extend circumferentially around the axis A for at most 90°. The first sensor window 110a and the second sensor window 110b can each extend circumferentially around the axis A for at most 45°. The comparatively small angular sweep of the sensor windows 110 with respect to the housing 106 provides a small area to keep clean and is accommodated by the fact that the housing 106 and the sensor windows 110 rotate.

The sensor windows 110 can be flat. For example, the sensor windows 110 can have a rectangular shape. The sensor windows 110 are transparent with respect to whatever medium the sensing apparatuses 108 are capable of detecting. For example, if the sensing apparatuses 108 are LIDAR devices, then the sensor windows 110 are transparent with respect to visible light at the wavelength generated and/or detectable by the sensing apparatuses 108.

Figure 3:
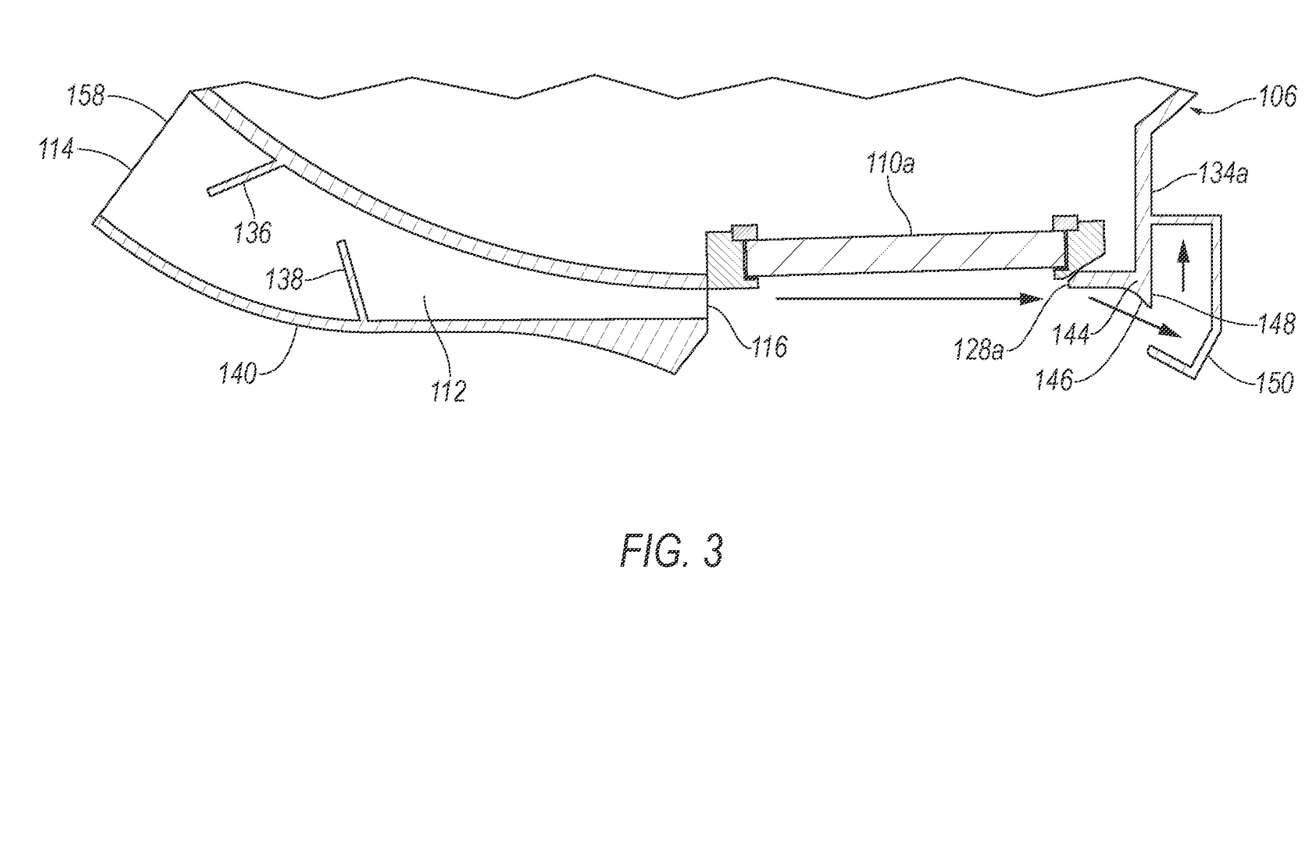
FIG. 3 is a top cross-sectional view of a portion of the first example of the sensor assembly.

With reference to FIG. 3, the housing 106 includes at least one outer wall 130, at least one window wall 132, and at least one nonwindow wall 134. For example, the housing 106 includes a first outer wall 130a, a first window wall 132a, a first nonwindow wall 134a, a second outer wall 130b, a second window wall 132b, and a second nonwindow wall 134b.

The housing 106 can be rotationally symmetric, e.g., second-degree rotationally symmetric. For the purposes of this disclosure, "rotationally symmetric" means looking the same after some rotation by a partial turn around an axis. A degree of rotational symmetry is a number of distinct orientations in which something looks the same for each rotation. The housing 106 has second-degree rotational symmetry, and the housing 106 looks the same when rotated by 180° so that the second outer wall 130b, the second window wall 132b, and the second nonwindow wall 134b occupy the space previously occupied by the first outer wall 130a, the first window wall 132a, and the first nonwindow wall 134a. Specifically, the second outer wall 130b, the second window wall 132b, and the second nonwindow wall 134b are rotationally symmetric by 180° around the axis A with respect to the first outer wall 130a, the first window wall 132a, and the first nonwindow wall 134a. The sensor windows 110 are also rotationally symmetric by 180° around the axis A with respect to each other. For the components labeled "first" in this disclosure, the sensor assembly 102 includes a corresponding component, which when discussed is labeled "second," that is second-degree rotationally symmetric around the axis A with respect to the first component. The following descriptions of the components labeled "first" apply as well to the respective rotationally symmetric components.

Figure 5:
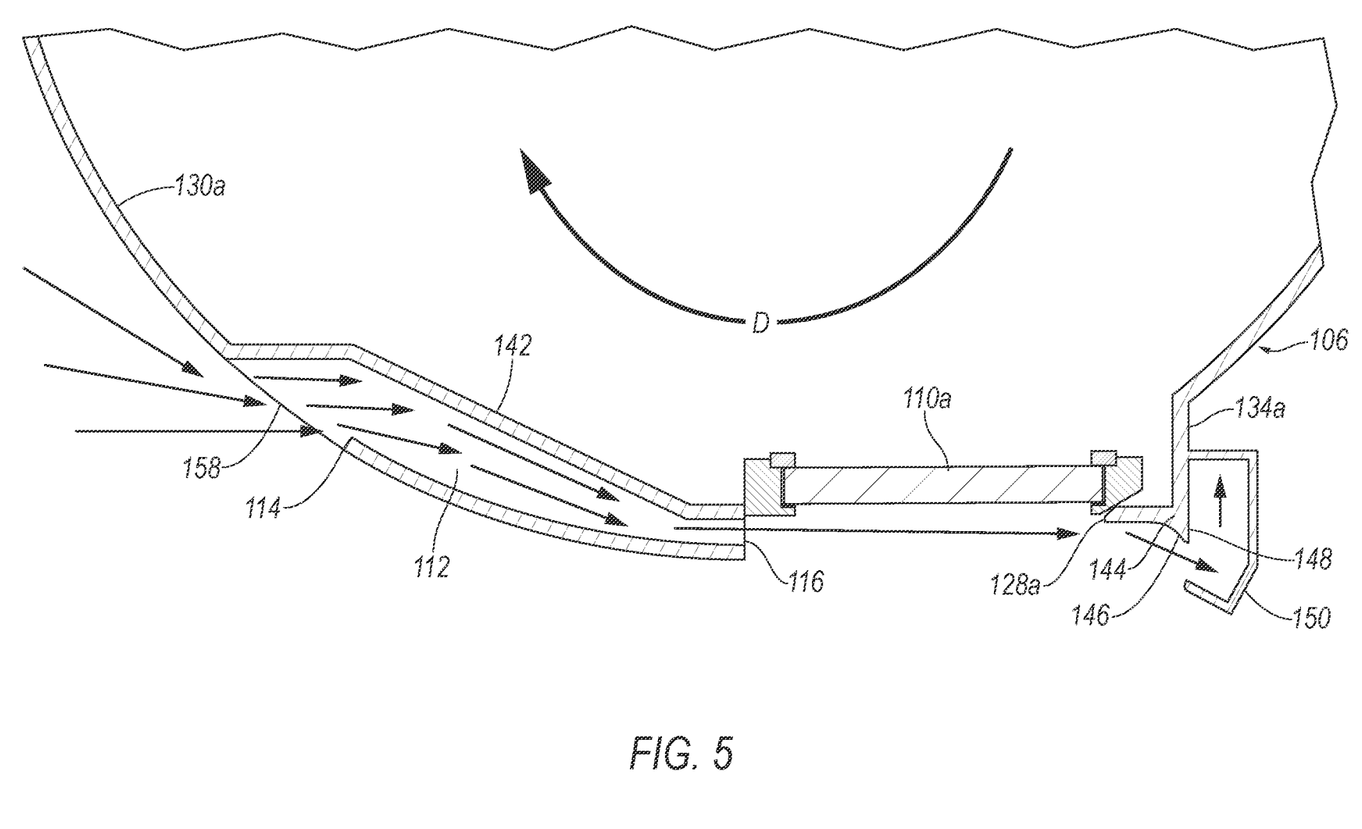
FIG. 5 is a top cross-sectional view of a portion of the second example of the sensor assembly.

The first outer wall 130a has a partial cylindrical shape extending circumferentially at a constant radius R from the axis A. The first outer wall 130*a* extends circumferentially at the constant radius R from the second nonwindow wall 134*b* to the first window wall 132*a*. The first outer wall 130*a* extends circumferentially for at least 90°. The first outer wall 130*a* extends circumferentially from the first inlet 114 in the direction of rotation D at the constant radius R toward the second sensor window 110*b*, specifically, to the second nonwindow wall 134*b*. The first outer wall 130*a* extends circumferentially from the first inlet 114 against the direction of rotation D at the constant radius R toward the first outlet 116 and the first sensor window 110*a*, and the first outer wall 130*a* partially forms the first duct 112, specifically forming either an interior wall of the first duct 112 as shown in FIGS. 2-3 or an exterior wall of the first duct 112 as shown in FIGS. 4-5. The first outer wall 130*a* extends vertically, i.e., parallel to the axis A, from below the sensor windows 110 to above the sensor windows 110.

The first window wall 132*a* is flat and parallel to the first sensor window 110*a*. The first window wall 132*a* extends completely around the first sensor window 110*a*, i.e., below, above, and to the sides. The first window wall 132*a* includes the first opening 128*a* in which the first sensor window 110*a* is positioned. The first window wall 132*a* extends from the first outer wall 130*a* to the first nonwindow wall 134*a*. The first window wall 132*a* extends in a direction tangent to the first outer wall 130*a*. The first window wall 132*a* extends vertically, i.e., parallel to the axis A, from below the first sensor window 110*a* to above the first sensor window 110*a*.

The first sensor window 110*a* is parallel to the first window wall 132*a*. The first sensor window 110*a* is recessed in the first window wall 132*a*. The first sensor window 110*a* extends from a point on the housing 106, e.g., the point on the first opening 128*a* that is closest to the axis A, which is also a point nearest the first outer wall 130*a*, in a direction that is radially outward and circumferential relative to the axis A. The first sensor window 110*a* is disposed farther from the axis A than the radius R of the first outer wall 130*a*. An exterior surface of the first sensor window 110*a* faces in a direction that is radially outward and circumferentially in the direction of rotation D relative to the axis A. For the purposes of this disclosure, a direction that a surface faces is a direction that is normal, i.e., perpendicular or orthogonal, to that surface.

The first nonwindow wall 134*a* extends from the first window wall 132*a* to the second outer wall 130*b*. The first nonwindow wall 134*a* can be flat. The first nonwindow wall 134*a* extends in a partially radially inward direction from the first window wall 132*a* relative to the axis A. The first nonwindow wall 134*a* can be nontangent to the second outer wall 130*b*. An exterior surface of the first nonwindow wall 134*a* faces in a direction that is radially outward and circumferentially away from the direction of rotation D relative to the axis A. The first nonwindow wall 134*a* extends vertically, i.e., parallel to the axis A, from below the sensor windows 110 to above the sensor windows 110.

The housing 106, specifically the first outer wall 130*a*, the first window wall 132*a*, the first nonwindow wall 134*a*, the second outer wall 130*b*, the second window wall 132*b*, and the second nonwindow wall 134*b*, can have a constant cross-section from a bottom of the sensor windows 110 to a top of the sensor windows 110. Except for the openings 128, the housing 106 can have a constant cross-section from a distance below the sensor windows 110 to a distance above the sensor windows 110. The constant cross-section can reduce forces tending to roll or pitch the housing 106 as the housing 106 rotates and the vehicle 100 travels.

With reference to FIGS. 2-5, the first duct 112 is on an exterior of the housing 106; e.g., the first outer wall 130*a* of the housing 106 is either an interior wall of the first duct 112 as shown in FIGS. 2-3 or an exterior wall of the first duct 112 as shown in FIGS. 4-5. The first duct 112 extends from the first inlet 114 against the direction of rotation D to the first outlet 116, and the first duct 112 defines an airflow path from the first inlet 114 against the direction of rotation D to the first outlet 116.

The first inlet 114 is an opening that permits air to enter from outside to inside the first duct 112. The first inlet 114 is open toward the direction of rotation D, i.e., when the housing 106 rotates in the direction of rotation D, the first inlet 114 is a leading surface and pushes through the air, instead of being on a trailing surface behind a surface pushing through the air. The rotation of the housing 106 thus pushes air into the first inlet 114. As the housing 106 rotates around the axis A, the path for external air to enter the first inlet 114 is unobstructed.

The sensor assembly 102 includes an air filter 158 covering the first inlet 114. For the purposes of this disclosure, "cover" means extend substantially completely across. The air filter 158 can be a semipermeable fabric. For the purposes of this disclosure, "semipermeable fabric" means a fabric that repels liquid water and allows air and water vapor to pass through. The semipermeable fabric may be formed of a layer of fibers of stretched polytetrafluoroethylene (PTFE), as well as possibly other layers. An example of a semipermeable fabric is GORE-TEX®. The semipermeable fabric is waterproof.

With reference to FIG. 3, the first duct 112 can include a plurality of baffles 136, 138, e.g., two baffles 136, 138, along the airflow path. The baffles 136, 138 can include an inboard baffle 136 and an outboard baffle 138. The inboard baffle 136 can extend radially outward from an interior wall of the duct and obstruct an inboard half of the airflow path, and the outboard baffle 138 can extend radially inward from an exterior wall of the duct and obstruct an outboard half of the airflow path. The two baffles 136, 138 can overlap horizontally, i.e., overlap in a radial direction relative to the axis A, i.e., an outboard edge of the inboard baffle 136 can be located a greater distance from the axis A than an inboard edge of the outboard baffle 138. The baffles 136, 138 are spaced from each other. The baffles 136, 138 can dehumidify the air flowing along the airflow path. When the airflow changes directions to flow around the baffles 136, 138, water droplets in the air with greater momentum than the air molecules may strike the baffles 136, 138 and collectively condense, thus removing humidity from the air.

Returning to FIGS. 2-5, the first outlet 116 is positioned to direct air across the first sensor window 110*a* and is aimed across the first sensor window 110*a*. The first outlet 116 directs the airflow path horizontally generally parallel to the first sensor window 110*a*. The first outlet 116 is open away from the direction of rotation D, i.e., when the housing 106 rotates in the direction of rotation D, the first outlet 116 is a trailing surface behind a surface pushing through the air, instead of being a leading surface and pushing through the air. The rotation of the housing 106 thus does not push external air against the air exiting from the first outlet 116.

The first outlet 116 has a smaller cross-sectional area than the first inlet 114. Specifically, heights of the first inlet 114 and the first outlet 116 can be approximately equal, and a width of the first inlet 114 can be greater than a width of the first outlet 116. The comparatively smaller cross-sectional area of the first outlet 116 increases the speed of the airflow through the first outlet 116, providing a greater velocity of airflow across the first sensor window 110a, which can better block or remove debris from the first sensor window 110a.

With reference to FIGS. 2-3, in a first example of the sensor assembly 102, the first inlet 114 extends radially outward from the first outer wall 130a relative to the axis A. The first duct 112 defines the airflow path radially outward from the first outer wall 130a relative to the axis A. The airflow path remains radially outside the first outer wall 130a from the first inlet 114 to the first outlet 116. The first outer wall 130a forms a radially interior wall of the first duct 112. The first duct 112 includes a radially exterior wall 140 positioned radially outward from the first outer wall 130a. The first example of the sensor assembly 102 provides a high rate of airflow through the first duct 112 because the first inlet 114 extends radially outward from the first outer wall 130a to capture external air.

With reference to FIGS. 4-5, in a second example of the sensor assembly 102, the first inlet 114 passes through the first outer wall 130a. The first duct 112 defines the airflow path radially inward from the first outer wall 130a relative to the axis A. The airflow path passes radially inside the first outer wall 130a at the first inlet 114 and remains radially inside the first outer wall 130a from the first inlet 114 to the first outlet 116. The first outer wall 130a forms a radially exterior wall of the first duct 112. The first duct 112 includes a radially interior wall 142 positioned radially inward from the first outer wall 130a. The second example of the sensor assembly 102 provides lower drag than the first example while still providing airflow across the first sensor window 110a.

Returning to both examples of the sensor assembly 102, with reference to FIGS. 3 and 5, the sensor assembly 102 includes a first ramp 144 positioned adjacent to the first sensor window 110a opposite the first outlet 116. The first ramp 144 is elongated from a bottom edge of the first sensor window 110a to a top edge of the first sensor window 110a. The first ramp 144 includes a leading surface 146 facing circumferentially toward the first sensor window 110a and a trailing surface 148 facing circumferentially away from the first sensor window 110a. The leading surface 146 and the trailing surface 148 are elongated parallel to the axis A from the bottom edge to the top edge of the first sensor window 110a. The first ramp 144, specifically the leading surface 146 and the trailing surface 148, has a constant cross-section from the bottom edge to the top edge of the first sensor window 110a. The leading surface 146 can form an oblique angle with the first sensor window 110a. The angle of the leading surface 146 is chosen to cause fluid to fly off of the leading surface 146, as opposed to flowing to the trailing surface 148 or gathering on the leading surface 146.

The sensor assembly 102 can include a first fluid catcher 150 positioned adjacent to the first ramp 144 opposite the first sensor window 110a. The first fluid catcher 150 is positioned to catch fluid flying off of the first ramp 144. The trailing surface 148 of the first ramp 144 faces circumferentially toward the first fluid catcher 150. The first fluid catcher 150 is a channel elongated parallel to the axis A and parallel to the first ramp 144 with an open portion of the channel shape facing toward the first ramp 144. The first fluid catcher 150 extends radially outward relative to the axis A farther than the first ramp 144. The first fluid catcher 150 permits fluid to flow downward below the first sensor window 110a, rather than flowing around the housing 106 to the second sensor window 110b.

Figure 6:
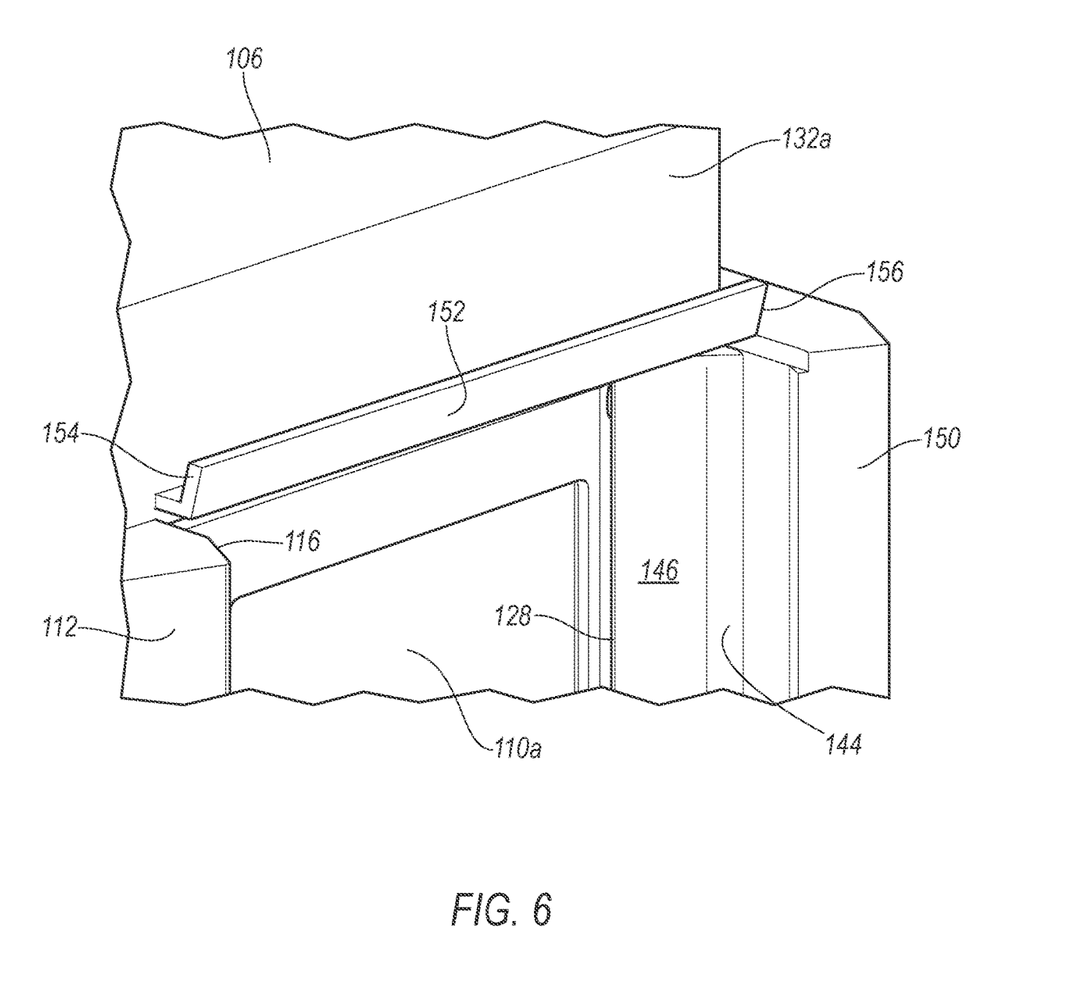
FIG. 6 is a perspective view of a portion of the first example of the sensor assembly.

With reference to FIG. 6, the sensor assembly 102 includes a first gutter 152. The first gutter 152 is above the first sensor window 110a and adjacent to the first sensor window 110a. The first gutter 152 can prevent fluid from flowing downward across the first sensor window 110a. The first gutter 152 has a channel shape with an open portion facing upward. The first gutter 152 is elongated from a beginning end 154 nearer to the first outlet 116 to an open end 156 farther from the first outlet 116. The beginning end 154 may be open or closed. The first gutter 152 is elongated horizontally parallel to the first sensor window 110a. The first gutter 152 extends radially outward from the beginning end 154 to the open end 156, and the first gutter 152 extends circumferentially against the direction of rotation D from the beginning end 154 to the open end 156. The rotation of the housing 106 applies centrifugal force to fluid in the first gutter 152, causing the fluid to flow away from the beginning end 154 and toward the open end 156. The open end 156 is open to permit fluid in the first gutter 152 to exit. The fluid may exit into the first fluid catcher 150.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance, order, or quantity. Many modifications and variations of the present disclosure are possible in light of the above teachings, and the disclosure may be practiced otherwise than as specifically described.

What is claimed is:

1. A sensor assembly comprising:
   a base;
   a housing mounted to the base and rotatable relative to the base around an axis in a direction of rotation;
   a sensing apparatus inside the housing and rotatable with the housing;
   a sensor window fixed relative to the housing, the sensing apparatus having a field of view through the sensor window; and
   a duct on an exterior of the housing, the duct including an inlet open toward the direction of rotation and an outlet aimed across the sensor window.

2. The sensor assembly of claim 1, further comprising a motor arranged to rotate the housing in the direction of rotation relative to the base.

3. The sensor assembly of claim 1, wherein the outlet is open away from the direction of rotation.

4. The sensor assembly of claim 1, wherein a cross-sectional area of the outlet is smaller than a cross-sectional area of the inlet.

5. The sensor assembly of claim 1, wherein the housing includes an outer wall having a partial cylindrical shape extending circumferentially from the inlet in the direction of rotation at a constant radius from the axis.

6. The sensor assembly of claim 5, wherein the sensor window is a first sensor window, the sensor assembly further comprising a second sensor window fixed relative to the housing, wherein the outer wall extends circumferentially from the inlet in the direction of rotation toward the second sensor window.

7. The sensor assembly of claim 5, wherein the outer wall extends circumferentially from the inlet toward the outlet at the constant radius, and the outer wall partially forms the duct.

8. The sensor assembly of claim 7, wherein the inlet extends radially outward from the outer wall relative to the axis, and the duct defines an airflow path radially outward from the outer wall relative to the axis.

9. The sensor assembly of claim 7, wherein the inlet passes through the outer wall, and the duct defines an airflow path radially inward from the outer wall relative to the axis.

10. The sensor assembly of claim 5, wherein the sensor window is disposed farther from the axis than the radius of the outer wall.

11. The sensor assembly of claim 10, wherein an exterior surface of the sensor window faces in a direction that is radially outward and circumferentially in the direction of rotation relative to the axis.

12. The sensor assembly of claim 1, further comprising a ramp positioned adjacent to the sensor window opposite the outlet.

13. The sensor assembly of claim 12, wherein the ramp includes a leading surface facing circumferentially toward the sensor window and a trailing surface facing circumferentially away from the sensor window, and the leading surface and the trailing surface are elongated parallel to the axis.

14. The sensor assembly of claim 13, wherein the leading surface and the trailing surface are elongated from a bottom edge of the sensor window to a top edge of the sensor window.

15. The sensor assembly of claim 1, further comprising a gutter elongated above the sensor window adjacent to the sensor window.

16. The sensor assembly of claim 15, wherein the gutter is elongated from a beginning end nearer to the outlet to an open end farther from the outlet.

17. The sensor assembly of claim 1, further comprising an air filter covering the inlet.

18. The sensor assembly of claim 17, wherein the air filter is a semipermeable fabric.

19. The sensor assembly of claim 1, wherein the sensor window extends circumferentially around the axis for at most 45°.

* * * * *